WILLIAM W. MURPHY
INVENTOR.

ATTORNEYS

WILLIAM W. MURPHY
*INVENTOR.*

ATTORNEYS

United States Patent Office 3,167,363
Patented Jan. 26, 1965

3,167,363
COMBINED RADIAL AND THRUST BEARING
William W. Murphy, Torrington, Conn., assignor to The Torrington Company, Torrington, Conn., a corporation of Maine
Filed Dec. 17, 1962, Ser. No. 245,099
15 Claims. (Cl. 308—174)

The following specification sets out in detail the novel construction of a combined radial and thrust bearing adapted for application over a wide variety of uses.

Many instances occur where the unitary assembly of a self-contained antifriction bearing is called for to sustain loads in both radial and axial directions. As an example, the bearing finds specific application in an automotive water pump. Here the shaft of the pump connects the drive pulley with the impeller and there is a definite need to minimize bearing stress both radially and in an axial direction. According to this invention a bearing unit is provided which can be press fitted in the housing bore and around the rotary pump shaft. It will then support the rotary shaft as the inner race of the bearing. At the same time, a shoulder on the shaft will cooperate with a thrust bearing in the unit to withstand axial stress.

One object of the invention is to provide a self-contained bearing that can be mounted as a unit in the housing or bore around a rotary shaft by press fitting in the bore. Such press fitting is normally sufficient to retain the bearing in normal operating position. If desired, the unit can however be held in place against a shouldered bore of the housing or by means of a snap ring or similar device.

A further object of the invention is to provide a combined bearing unit which will operate in conjunction with a shouldered shaft to sustain both radial and axial thrust.

The bearing unit is well adapted for assembly of a full complement of bearing rollers or alternatively, a series of rollers separated by a retainer or spacer.

In like manner, the thrust bearing may be either a full complement of bearing balls, a series of balls held in spaced relation by means of a retainer or even a series of rollers held in a cage or the like.

It is an important feature of the invention that the thrust bearing component is an integral part of the thin wall unitary drawn cup bearing such as is disclosed in the patent of E. K. Brown, December 8, 1936, No. 2,063,787.

Among the objects of the invention is to design a bearing unit for both radial and axial thrust which will provide adequate accommodation for a lubricant, successfully retaining the latter against loss.

It will of course be understood that the bearing unit can be operated in conjunction with a shouldered inner race. This may form part of the rotating shaft or other element.

As illustrating the invention I have shown the preferred forms by way of example on the accompanying drawings in which.

Figure 1:
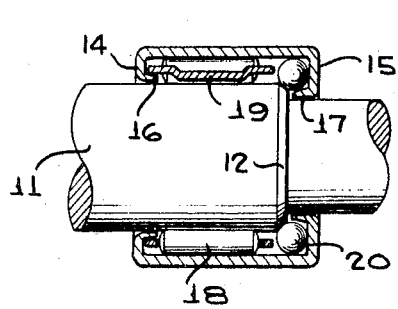
FIGURE 1 is a vertical longitudinal sectional view of the combined bearing unit fitted on a rotary shaft.

In brief, the invention consists in providing an antifriction bearing unit which may be installed as an entirety in the bore of a housing surrounding a rotary shaft. The bearing provides bearing rollers to withstand radial stress. There is also provided a series of antifriction bearings which will react against axial pressure on the shaft. These antifriction bearing members may be balls, although in some instances a more amplified thrust bearing using rollers can be provided.

The thrust may be received directly from the shaft or may be transmitted by an intermediate ring or coller fitted against a shoulder of the shaft.

As illustrated on FIGURES 1 to 4 inclusive, the rotary shaft 11 is provided with a sloping or oblique shoulder 12. The combination radial and thrust bearing unit 13 is in the form of an outer race of stamped sheet metal or the like suitably hardened to endure the rolling contact of the bearing elements.

One end of the race 13 is inwardly to form an inwardly directed end 14. The member 13 is also bent in to form an opposite end 15. The lengths of the inturned ends conform to the approximate diameters of the shaft at these points.

The inwardly directed end 14 has an inwardly turned flange 16 substantially parallel with the main body of the race 13. In like manner, the opposite end 15 has an inturned flange 17, also parallel to the main body 13.

A series of bearing rollers 18 fit within the space between the outer race 13 and the opposite surface of the shaft 11.

As illustrated in FIGURE 1, a retainer or cage 19 of formed sheet metal is provided to space the rollers 18 apart from each other and maintain them parallel to the axis of the shaft 11. The left end of the retainer 19 overlies the flange 16 and abuts the inner surface of end 14. The retainer or cage holds the bearing rollers from falling inwardly when the shaft is removed.

In this instance, the rollers 18 have rounded ends.

A series of bearing balls 20 forming a full complement, occupy the complete channel provided between the flange 17 and the main portion of the race 13. These balls 20 fit between the ends 15, the outer race 13 and the shoulder 12. There is thus provided a three-point bearing of the balls on these elements.

It will be apparent that in order to accomplish this result, the balls 20 have diameters which are greater than that of the corresponding rollers 18.

It is to be understood that the distance from the end of the retainer 19 to the edge of the flange 17 is less than the diameter of the balls 20 so that the latter are prevented from dropping out of the groove in handling.

Figure 2:
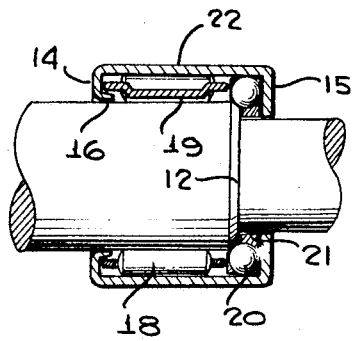
FIGURE 2 is a similar sectional view of the unit in which the bearing balls are held in a retainer.

The combined bearing in FIGURE 2 is similar to that described in FIGURE 1 with the exception that the outer race 22 has an end 15 terminating at right angles to the main body of the race. There is, however, no flange 17.

The function of the flange 17 to prevent the inadvertent loss of the balls 20 is carried out by a spacer 21. This has an inner diameter slightly greater than the reduced diameter of the shaft 11. It serves to hold the spaced balls in three-point contact with the outer race 22, its end 15 and the shoulder 12 of the shaft.

Figure 3:
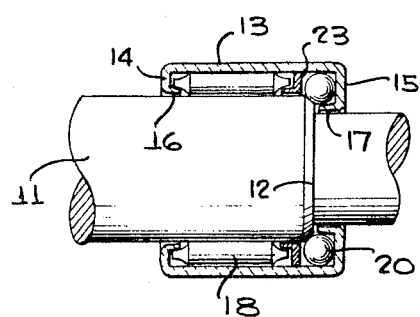
FIGURE 3 is a similar sectional view of the unit with full complement of both rollers and balls.

FIGURE 3 shows the race 13 as in FIGURE 1. In this instance, however, the rollers 18 have tapered ends and there is a full complement of them, that is, they completely fill the raceway and are not held by a retainer or spacer. The left-hand tapered ends of the rollers fit in the groove above the flange 16.

A flanged collar or ring 23 fits within the race 13 and receives the tapered ends of the rollers 18. The rollers are thus confined within the race in the same manner as when a retainer is used.

The full complement of bearing balls 20 are held in by the right-hand flange 17 in conjunction with the flanged collar 23. Here again, the collar is spaced from the flange 17 a distance less than the diameter of the bearing balls 20, so that the latter cannot be inadvertently removed. In this case, also, the three-point contact exists between the outer race 13, the end 15 and the shoulder 12.

Figure 4:
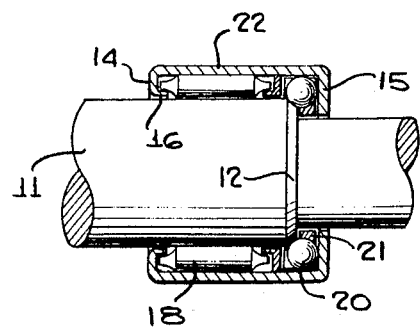
FIGURE 4 is a similar sectional view of the unit in which a full complement of rollers is used in conjunction with bearing balls in a retainer.

FIGURE 4 shows the same general construction as described for the bearing assembly in FIGURE 3. There is, however, a spacer and retainer 21 used with the balls 20 in lieu of the flange 17. In this respect the construction is similar to what has been shown in FIGURE 2.

The form of the invention shown in FIGURES 5 to 10 inclusive, illustrates the novel, combined bearing adapted for use in conjunction with the shaft 11, in which the sloping shoulder 12 has been replaced by an abrupt right-angled shoulder 24.

Figure 5:
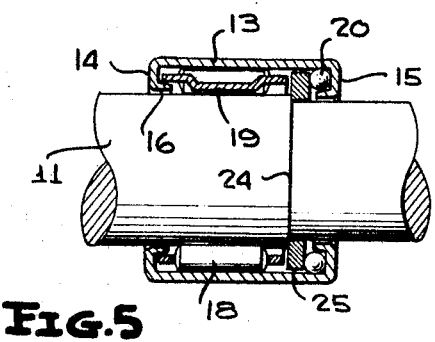
FIGURE 5 is a similar sectional view of the unit in which rollers and their retainer are used with a full complement of balls and an intermediate thrust ring or collar.

The combination bearing includes an abutting ring 25 between the retainer 19 and bearing balls 20. This abutting ring fits against the shoulder 24 of the shaft. It limits the longitudinal movement of the retainer 19. In this case, the use of the ring 25 permits the use of a much smaller ball 20. In FIGURE 5, a full complement of balls 20 is provided, while the rollers are held in a retainer 19.

Figure 6:
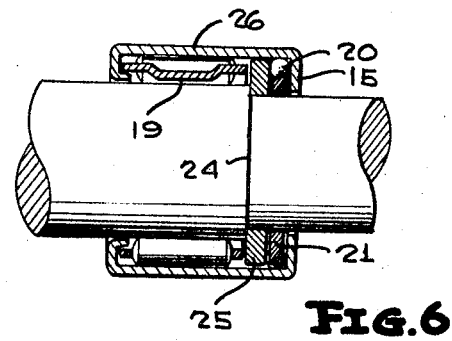
FIGURE 6 is a similar view of a modified form of the last named in which the balls are set in a retainer or spacer.

In FIGURE 6, the rollers 18 are held in a retainer 19. One end of the latter fits within the flange 16 of the outer race 26. The abutting ring 25 fits against the shoulder 24 and is in contact with the balls 20. The latter are held in a retainer 21 having the same internal diameter as the ring.

Figure 7:
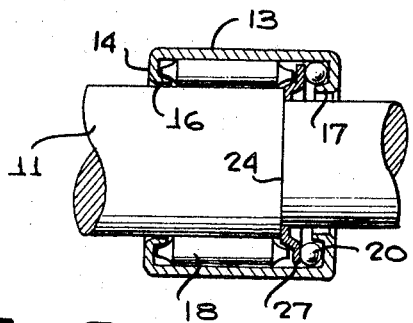
FIGURE 7 is a similar view of a modified form in which full complements of both rollers and balls are used with an intermediate thrust ring.
Figure 8:
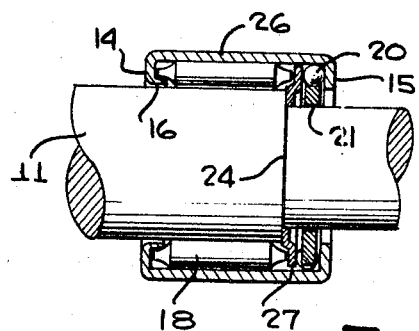
FIGURE 8 is a similar view of a modified form in which a full complement of rollers is used with a thrust ring and a series of bearing balls in a retainer.

FIGURES 7 and 8 provide full complements of rollers 18 within the outer races.

In FIGURE 7, the abutting ring 27 is terraced or offset. Its inner flange fits against the abrupt shoulder 24 of the shaft 11. The outer rim of the ring 27 rests against a complete complement of bearing balls 20. The latter are confined by an inturned flange 17 on the end 15.

The outer race 26 in FIGURE 8 has an inwardly directed end 15, but no flange 17. Providing a retainer ring 21 to hold the balls 20, performs the same function as the flange would. The balls are held between the end 15 and the outer rim of the abutting ring 27.

Figure 9:
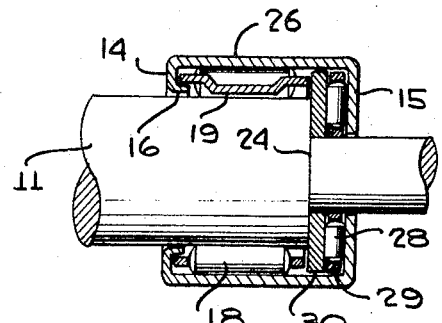
FIGURE 9 is a similar view of a modified form in which the rollers are held in a retainer and the thrust is sustained by a roller thrust bearing.
Figure 10:
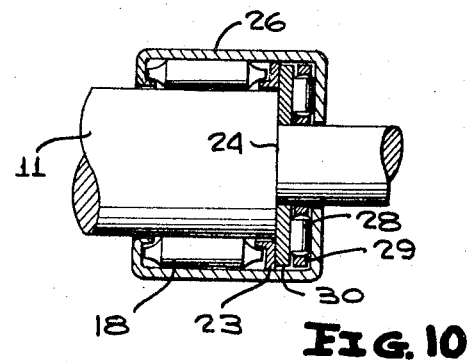
FIGURE 10 is a similar view of such a form in which there is a full complement of rollers.

FIGURES 9 and 10 illustrate the invention in the form in which the thrust bearing is provided by rollers 28. These are held in a retainer 29 against the inwardly directed end 15 of the outer race 26.

In this instance, the shoulder 24 on the shaft 11 is materially wider. It provides a seat for a disc or ring 30. This is an abutment against which the rollers 28 fit.

In FIGURE 9 the rollers 18 are separated by a retainer 19 in the manner previously described.

As shown in FIGURE 10, there is a full complement of rollers 18 completely filling the raceway. Here again as in FIGURE 4, a flanged collar or ring 23 is provided to contain the tapered ends of the rollers 18.

The improved combined radial and axial bearing as above described can be easily formed in an economical manner, by relatively unskilled labor. As completely assembled, it can be handled as a unit in storage, shipment or installation. It is readily mounted within the bore of a housing, around a shaft or the like by press fitting, snap ring or the like. It occupies a minimum amount of space. It efficiently provides for a non-friction bearing in both radial and axial directions.

The shape of the outer race or shell taken with the associated parts provides for adequate supply of lubricant without loss of the latter.

As indicated above, it may be constructed in various modifications and suitable materials without departing from the scope of the following claims.

What I claim is:

1. A drawn metal outer race having inwardly directed ends, one of said ends being turned inwardly parallel to the body of the race to form a flange, a series of bearing rollers confined in the race within the flange and a series of bearing balls confined within the race by the opposite end.

2. A drawn metal outer race having inwardly directed ends, one of said ends being turned inwardly parallel to the body of the race to form a flange, a series of bearing rollers confined in the race within the flange, a retainer for the rollers, said retainer being held by the end flange, and a series of bearing balls confined within the race by the opposite end.

3. A drawn metal outer race having inwardly directed ends, each of said ends being turned inwardly parallel to the body of the race to form a flange, a series of bearing rollers confined in the race within the flange of one end, and a series of bearing balls confined within the race by the flange of the opposite end.

4. A drawn metal outer race having inwardly directed ends, each of said ends being turned inwardly parallel to the body of the race to form a flange, a series of bearing rollers confined in the race, a retainer for the rollers, said retainer being held by the flange on one end, a series of bearing balls of greater diameter than the rollers, said balls being confined within the race by the flange on the opposite end.

5. A drawn metal outer race having inwardly directed ends, one of said ends being turned inwardly parallel to the body of the race to form a flange, a series of bearing rollers confined in the race, a retainer for the rollers, said retainer being held by the end flange, a series of bearing balls of greater diameter than the rollers, a retainer for said balls, said balls being confined within the race by the opposite end.

6. A drawn metal outer race having inwardly directed ends, one of said ends being turned inwardly parallel to the body of the race to form a flange, a full complement series of bearing rollers confined in the race by said flange, a ring in the race for holding the opposite ends of the rollers, and a series of balls confined within the race by the opposite end.

7. A drawn metal outer race having inwardly directed ends, each of said ends being turned inwardly parallel to the body of the race to form a flange, a full complement series of bearing rollers confined in the race by one end flange, a ring in the race for holding the opposite ends of the rollers, and a full complement series of bearing balls confined within the race by the opposite end flange.

8. A drawn metal outer race having inwardly directed ends, one of said ends being turned inwardly parallel to the body of the race to form a flange, a full complement series of bearing rollers confined in the race by said flange, a ring in the race for holding the opposite ends of the rollers, a series of bearing balls of greater diameter than the rollers, a retainer for said balls, said balls being confined by the end of the race.

9. A drawn metal outer race having inwardly directed ends, one of said ends being turned inwardly parallel to the body of the race to form a flange, a series of bearing rollers confined in the race by said flange, an abutting ring in the race opposite the other ends of the rollers, said ring extending inwardly of said rollers, a series of thrust bearing elements beyond the ring and opposed by the opposite end of the race.

10. A drawn metal outer race having inwardly directed ends, each of said ends being turned inwardly parallel to the body of the race to form a flange, a series of bearing rollers, a retainer for the rollers, said retainer being confined in the race by the flange at one end, an abutting ring in the race opposite the other end of the retainer, said ring extending inwardly of said rollers, a full complement series of bearing balls beyond the ring and confined in the race by the flange on the adjacent end.

11. A drawn metal outer race having inwardly directed ends, one end of said ends being turned inwardly parallel to the body of the race to form a flange, a series of bearing rollers, a retainer for the rollers, said retainer being confined in the race by the flange at one end, an abutting ring in the race opposite the other end of the retainer, said ring extending inwardly of said rollers, a series of thrust bearing elements beyond the ring, a retainer for said elements, said elements being confined by the adjacent end of the race.

12. A drawn metal outer race having inwardly directed ends, one of said ends being turned inwardly parallel to the body of the race to form a flange, a series of bearing rollers, a retainer for the rollers, said retainer being confined in the race by the flange at one end, an abutting ring in the race opposite the other end of the retainer, said ring extending inwardly of said rollers, a series of bearing balls beyond the ring, a retainer for said balls having the same internal diameter as the ring, said balls being confined by the adjacent end of the race.

13. A drawn metal outer race having inwardly directed ends, one end of said ends being turned inwardly parallel to the body of the race to form a flange, a series of bearing rollers, a retainer for the rollers, said retainer being confined in the race by the flange at one end, an abutting ring in the race opposite the other end of the retainer, said ring extending inwardly of said rollers, a series of thrust bearing rollers beyond the ring, a retainer for said thrust rollers having the same internal diameter as the ring, said thrust rollers being confined by the adjacent end of the race.

14. A drawn metal outer race having inwardly directed ends, one of said ends being turned inwardly parallel to the body of the race to form a flange, a full complement series of bearing rollers, said rollers being confined in the race by the flange, an abutting ring in the race opposite the other ends of the rollers, said ring extending inwardly of the rollers, a series of thrust bearing rollers beyond the ring, a retainer for said thrust rollers having the same inner diameter as the ring, said thrust rollers being confined by the adjacent end of the race.

15. A drawn metal outer race having inwardly directed ends, one of said ends being turned inwardly parallel to the body of the race to form a flange, a full complement series of bearing rollers, said rollers being confined in the race by the flange, a flanged ring in the race opposite the other ends of the rollers, an abutting ring in the race opposite the flanged ring, the abutting ring extending inwardly of the rollers, a series of thrust bearing rollers beyond the abutting ring, a retainer for said thrust rollers having the same inner diameter as the abutting ring, said thrust rollers being confined by the adjacent end of the race.

References Cited by the Examiner

UNITED STATES PATENTS

| 2,063,787 | 12/36 | Brown | 308—174 |
| 2,208,724 | 7/40 | Griswold | 308—174 |
| 2,404,084 | 7/46 | Norton | 308—174 |
| 2,839,343 | 6/58 | Bensch | 308—174 |
| 3,043,634 | 7/62 | Coley | 308—174 X |

FOREIGN PATENTS

| 1,150,412 | 8/57 | France. |
| 840,940 | 6/52 | Germany. |
| 966,513 | 8/57 | Germany. |

FRANK SUSKO, *Primary Examiner.*

ROBERT C. RIORDON, *Examiner.*